United States Patent
Badri et al.

(10) Patent No.: US 11,126,901 B2
(45) Date of Patent: Sep. 21, 2021

(54) SYSTEM AND METHOD FOR FLEXIBLE ASSET TRACKING TAG

(71) Applicant: CoreKinect LLC, Tempe, AZ (US)

(72) Inventors: Assar Badri, Scottsdale, AZ (US);
Mitchel Kelley, Gilbert, AZ (US);
Almedin Kozlica, Phoenix, AZ (US)

(73) Assignee: CoreKinect LLC, Tempe, AZ (US)

( * ) Notice: Subject to any disclaimer, the term of this patent is extended or adjusted under 35 U.S.C. 154(b) by 0 days.

(21) Appl. No.: 16/874,387

(22) Filed: May 14, 2020

(65) Prior Publication Data
US 2020/0364523 A1 Nov. 19, 2020

Related U.S. Application Data

(60) Provisional application No. 62/847,843, filed on May 14, 2019.

(51) Int. Cl.
| | |
|---|---|
| *G06Q 30/00* | (2012.01) |
| *G06K 19/02* | (2006.01) |
| *G06K 19/07* | (2006.01) |
| *G06K 19/06* | (2006.01) |

(52) U.S. Cl.
CPC ....... *G06K 19/025* (2013.01); *G06K 19/0702* (2013.01); *G06Q 30/018* (2013.01); *G06K 2019/06253* (2013.01)

(58) Field of Classification Search
CPC . G06K 19/025; G06K 19/0702; G06Q 30/018
USPC .......................................................... 235/385
See application file for complete search history.

(56) References Cited

U.S. PATENT DOCUMENTS

| | | | |
|---|---|---|---|
| 2001/0007335 A1 | 7/2001 | Tuttle et al. | |
| 2004/0217865 A1* | 11/2004 | Turner | G06K 19/0702 340/572.7 |
| 2006/0176179 A1 | 8/2006 | Skorpik et al. | |
| 2008/0143519 A1 | 6/2008 | Piotrowski | |
| 2012/0206887 A1* | 8/2012 | Tucholski | H05K 1/16 361/749 |
| 2017/0042119 A1* | 2/2017 | Garrity | G01S 5/0294 |
| 2017/0074002 A1* | 3/2017 | Cooper | E05B 65/523 |
| 2018/0163095 A1* | 6/2018 | Khoche | G06K 19/07773 |

\* cited by examiner

*Primary Examiner* — Ahshik Kim
(74) *Attorney, Agent, or Firm* — Noblitt & Newson, PLLC

(57) ABSTRACT

A flexible asset tracking tag according to various aspects of the present technology include a self-powered tracking device on a flexible substrate. The flexible asset tracking tag may be configured to transmit data in response to sensed conditions. The flexible asset tracking tag may also be configured to conserve battery power in response to programmed intervals or sensed conditions.

13 Claims, 4 Drawing Sheets

SYSTEM AND METHOD FOR FLEXIBLE ASSET TRACKING TAG

CROSS-REFERENCES TO RELATED APPLICATIONS

This application claims the benefit of U.S. Provisional Patent Application No. 62/847,843, filed May 14, 2019, and incorporates the disclosure of the application by reference.

BACKGROUND OF THE TECHNOLOGY

Various manufactured products go through many production phases between initial manufacture, distributors, and consumer delivery. Tracking the manufactured products from supplier lots through finished products and consumer delivery is used by businesses to gain control over the product quality, reduce risks, and maintain competitiveness in the marketplace. Regulated industries such as food and pharmaceutical products may require detailed tracking of their product's source suppliers, lot numbers, serial numbers, temperature during handling and/or shipping, and the consumer that received the finished product in order to respond to consumer complaints and regulatory requirements.

Conventional lot and serial number systems have many limitations in the printing and scanning process to track products. The printing of serial and lot numbers may require space on the product that small products may not have. The scanning process to track the products may require human personnel, increasing cost and decreasing accuracy.

SUMMARY OF THE TECHNOLOGY

A flexible asset tracking tag according to various aspects of the present technology include a self-powered tracking device on a flexible substrate. The flexible asset tracking tag may be configured to transmit data in response to sensed conditions. The flexible asset tracking tag may also be configured to conserve battery power in response to programmed intervals or sensed conditions.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various process steps, apparatus, systems, methods, materials, hardware, software, etc. In addition, the present technology may be practiced in conjunction with any number of devices for transmitting and receiving data and the system described is merely one exemplary application for the technology.

A flexible asset tracking tag according to various aspects of the present technology may operate in conjunction with any flexible substrate or nonconductive material such as comprise polyamide and/or polybutylene terephthalate (PBT) used to form flexible circuit boards. Various representative implementations of the present technology may be applied to inventory tracking systems. For example, the flexible asset tracking tag may be used to track an asset such as: consumable food items as they move through the supply chain; the location of a given item within a warehouse, or to track chain of delivery for pharmaceuticals.

Figure 1:
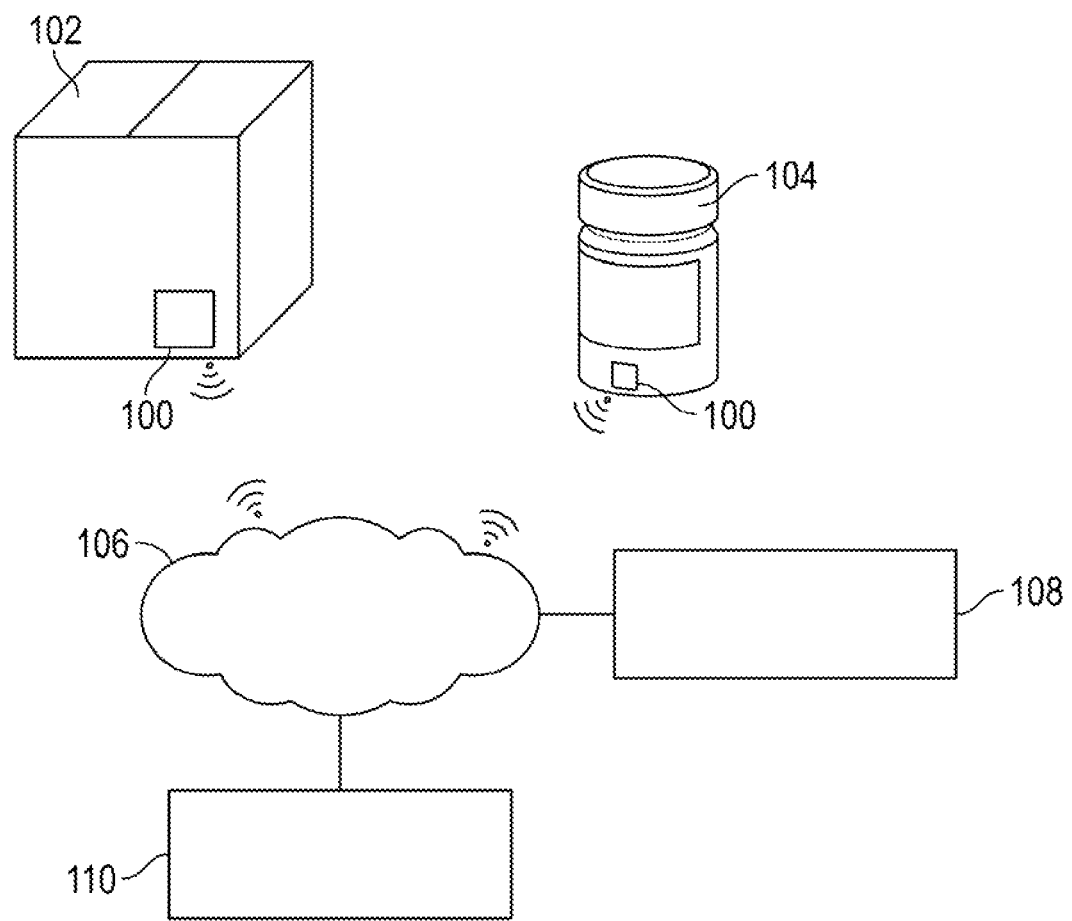
FIG. 1 representatively illustrates a block diagram of a tracking system using a flexible asset tracking tag in accordance with an exemplary embodiment of the present technology.

Referring to FIG. 1, an exemplary embodiment of the asset tracking device 100 may comprise a flexible asset tracking tag 100 configured to be adhered or otherwise attached to a package or product that moves through a supply chain from a manufacturer or distributor to an end user. The flexible asset tracking tag 100 may be applied to any asset, such as a shipping container 102, a pharmaceutical container such as a pill bottle 104, a beverage container, or any other like package or container that a user wished to track through the supply chain. The flexible asset tracking tag 100 may be scaled to any suitable size to fit the asset being tracked. For example, in one embodiment, the flexible asset tracking tag 100 may comprise a dimension of about 1.5 inches (38 mm) by about 1.9 inches (48 mm) and be easily applied to a surface of the asset such as along an outer surface of the shipping container or underneath a printed bar code attached to the shipping container 102. The actual dimensions of the flexible asset tracking tag 100 may be determined according to the size of the asset or package on which the flexible asset tracking tag 100 will be attached to.

The flexible asset tracking tag 100 may comprise its own power source and communication system to allow remote tracking of the asset without human personnel having to be near the asset or require direct interaction. The flexible asset tracking tag 100 may comprise a communication device be configured to wirelessly (WIFI, Bluetooth®) transmit sensed information and/or stored asset identifying information over a communication network 130 to a remote system such as a database or portable computing device. Transmission of information may occur at preselected intervals, in response to a signal from an onboard sensor, in response to a wireless signal from another device, or upon query by one or more users or systems throughout the supply chain. The network 130 may be communicatively linked to one or more tracking databases 108 that may store and/or process the transmitted information. The tracking database 108 may be configured to communicate with a user application 110 to display the processed information. The user application 110 may also be configured to communicate directly with the flexible asset tracking tag 100 to retrieve the information.

Figure 2:
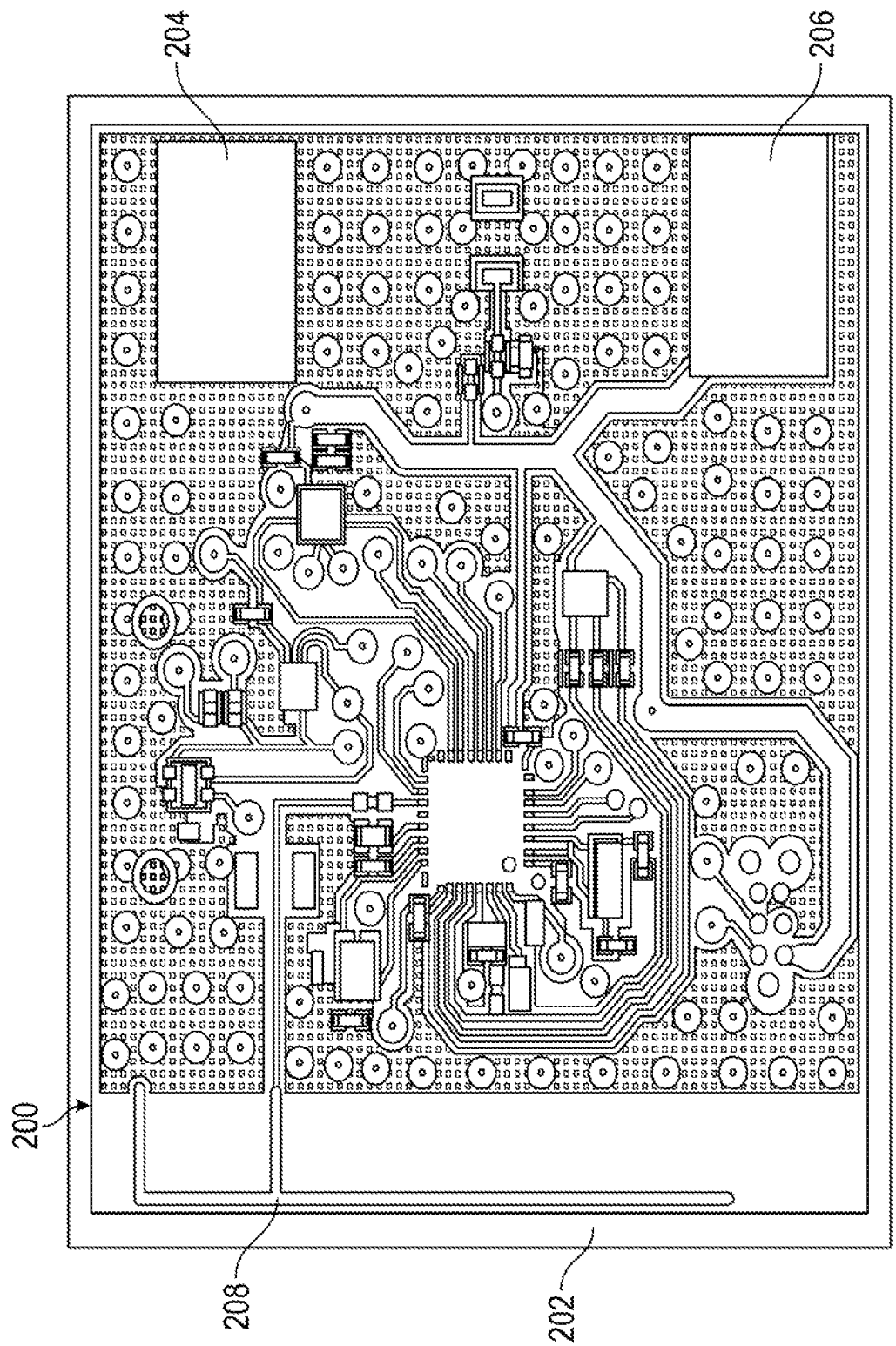
FIG. 2 representatively illustrates a flexible circuit board in accordance with an exemplary embodiment of the present technology.
Figure 3:
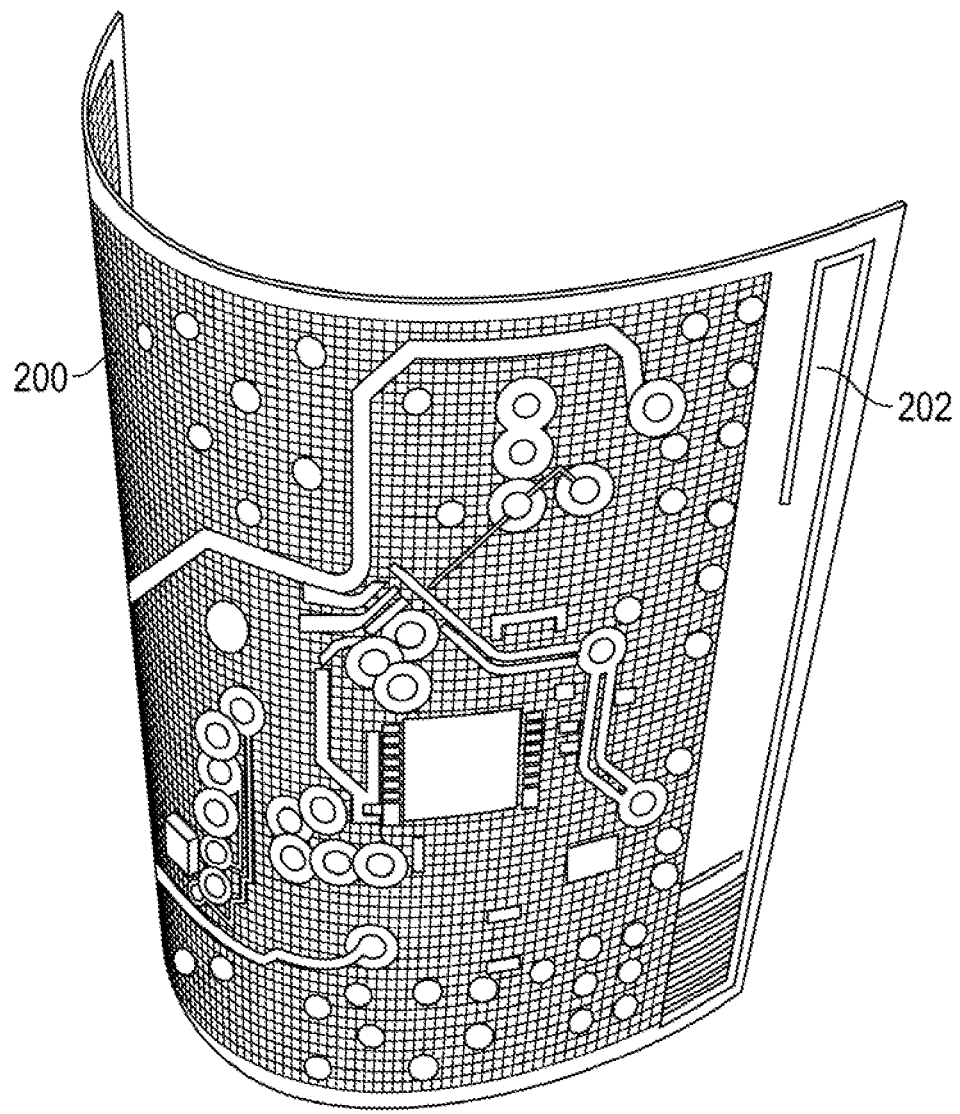
FIG. 3 representatively illustrates a perspective front view of the circuit board in a flexed position in accordance with an exemplary embodiment of the present technology.

Referring to now FIGS. 2 and 3, the flexible asset tracking tag 100 may comprise a circuit board 200 having a microcircuit, a pair of battery terminals 204, 206, one or more sensors, a security element, and an antenna 208. The circuit board may be positioned on a flexible substrate 202. The flexible substrate 202 may comprise any nonconductive material such as a nonconductive plastic. For example, the flexible substrate 202 may comprise polyamide and/or polybutylene terephthalate (PBT).

The microcircuit may comprise a main microcontroller, input output ports (I/O ports), a memory device and any other suitable components. For example, in one embodiment, the microcircuit may comprise a Bluetooth transmitter and or a micro Global Positioning System (GPS) chip that is configured to generate a signal for transmission by the communication device in response to the occurrence of a specified condition. The microcircuit may also be programmed to conserve the life of the battery. For example, the microcircuit may transmit "pings" such that the end user can calculate the life of the battery or remain in sleep mode until the flexible circuit board 200 comes into an RFID field. For example, the flexible circuit board 200 may be programmed to go into sleep mode until the flexible asset tracking tag 100 comes into an RFID field, a sensor on the flexible circuit board 200 may detect the RFID field and then search for a beacon or wireless gateway such as a Bluetooth® access point, and then transmit information once a communication network has been identified. Subsequently, once beacons are not detectable by the sensor for a predetermined period of time, the flexible circuit board 200 may revert back to sleep mode to conserve the life of the battery.

Figure 4:
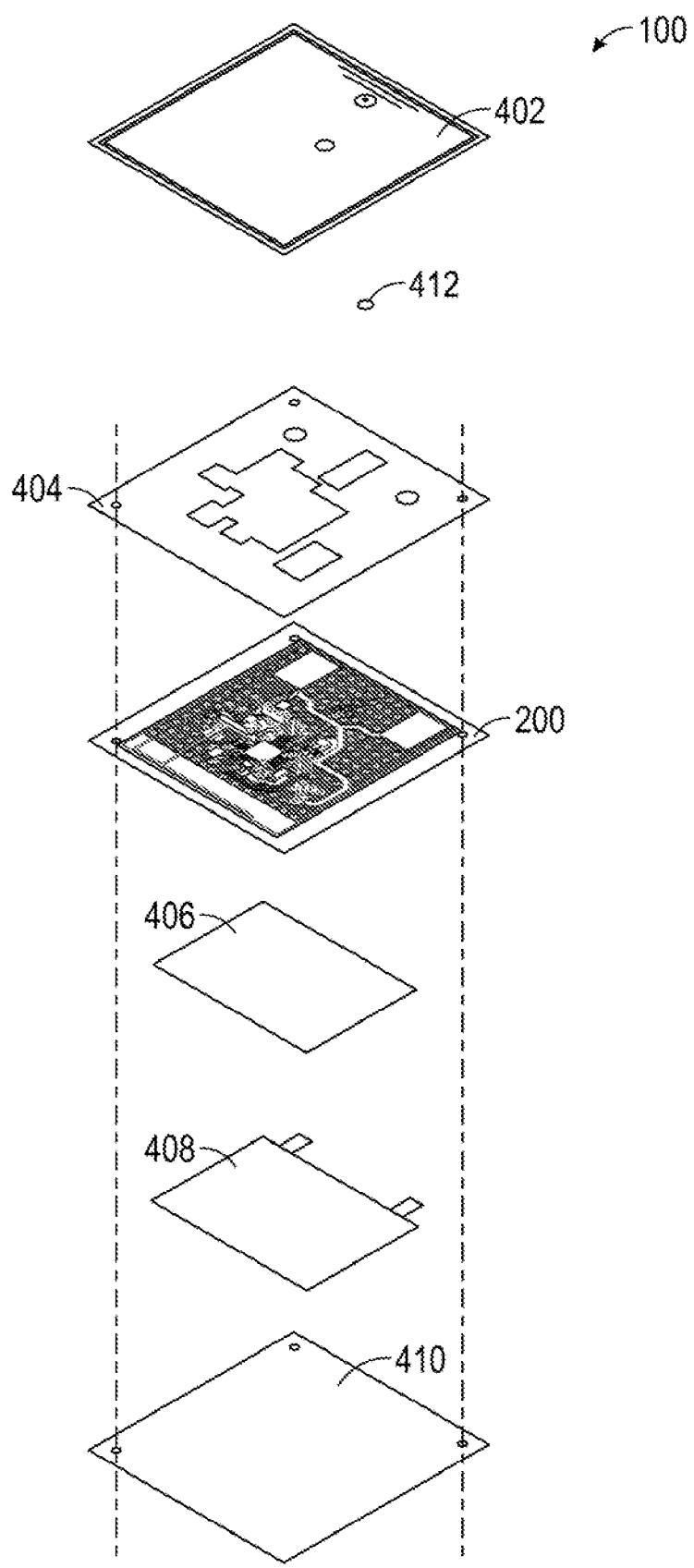
FIG. 4 representatively illustrates an exploded view of the flexible asset tracking tag in accordance with an exemplary embodiment of the present technology.

Referring now to FIG. 4, the flexible asset tracking tag 100 may comprise a layered structure having a top sheet 402 that acts as a cover and a bottom sheet 410. Various components may be positioned between the top and bottom sheets 402, 410. For example, the battery 408 may be mounted to the bottom sheet 410 by an adhesive mounting pad 406. The flexible circuit board 200 may be disposed above the adhesive mounting pad 406 and electrically connected to the battery 408 via the battery terminals 204, 206. The flexible circuit board 200 may be covered by a protective layer 404 which is positioned below the top sheet 402.

The bottom sheet 410 may be configured to be affixed, or otherwise coupled the asset. In an exemplary embodiment, a bottom facing surface of the bottom sheet may comprise an adhesive layer that may allow the flexible asset tracking tag 100 to be attached directly to a surface of the shipping container 102 or pill bottle 104.

The battery 408 may provide power to each of the electronic components on the flexible circuit board 200. In some embodiments, the battery 408 may be any thin film, flexible, or printed battery cell that may allow for safe transmission of power to the electronic components without risk of fire. For example, the battery 408 may comprise advanced lithium-ion batteries, solid-state batteries, microbatteries, stretchable batteries, thin flexible supercapacitors, or a manganese dioxide-based battery. The battery 408 may also be configured with an extended life to account for periods of storage or travel between points in the supply chain. Coupled with a programmed flexible circuit board 200 that is configured to reduce power requirements by using a sleep mode, the battery 408 may have a life of up to 12 months.

A device power state transition system may be coupled to the battery 408 and be used to activate the battery when the flexible asset tracking tag 100 is initially placed into service. The device power state transition system may comprise an activation sensor coupled to the battery 408. The device power state transition system may be configured to automatically sense a predetermined event, such as when the flexible asset tracking tag 100 is placed into service, and activate the battery to fully power the flexible asset tracking tag 100. For example, during manufacture of the flexible asset tracking tag 100, the flexible circuit board 200 powered by the battery 408 may be placed into a deep sleep or ultra-low power mode to conserve the available amount of battery charge for as long as possible. After manufacture, the flexible asset tracking tag 100 may be packaged for sale and subsequently distributed. When the flexible asset tracking tag 100 is placed into service by an end user, the device power state transition system may trigger the flexible circuit board 200 or battery 408 to automatically switch from the ultra-low power mode to an active fully functioning state. For example, when the flexible asset tracking tag 100 is removed from its original packaging, the activation sensor may create a signal to automatically "wake" the flexible asset tracking tag 100 from the low power mode so that it may perform its intended function.

The activation sensor may trigger activation of the battery by any suitable method. For example, the activation sensor may generate a signal that is transmitted to the circuit board to "wake" the circuit board up. Alternatively, the activation sensor may trigger activation of the battery by completing or closing an electrical circuit when the activation sensor senses the predetermined event.

The activation sensor may comprise any suitable device or element for sensing the predetermined event and causing the battery 408 to switch power states such as a button, a reed switch, an accelerometer, an electrical trace line, or an environmental sensor. In one embodiment, the activation sensor may comprise an ambient light detector configured to sense a change in a light condition signaling that the flexible asset tracking tag 100 has entered into an active and operational state requiring full battery power.

For example, one or more flexible asset tracking tags 100 may be stored inside a container and away from ambient light. When one of the flexible asset tracking tags 100 is removed from the container and exposed to ambient light, the activation sensor may detect the changed light condition and signal the battery 408 to wake up and begin powering the flexible asset tracking tag 100 for use. In an alternative embodiment, the activation sensor may comprise a reed switch. For example, similar to the example provided above, one or more of the flexible asset tracking tags 100 may be stored inside a container. When one of the flexible asset tracking tags 100 is removed from the container it may move past a magnet positioned on a surface of the container. Once the activation sensor detects the presence of the magnet, the activation sensor may generate a signal and wake the battery 408 to begin powering the flexible asset tracking tag 100 for use.

In various embodiments, the flexible asset tracking tag 100 may also comprise one or more additional sensors 412 coupled to the battery and the flexible circuit board 200. The sensor 412 may comprise any sensor configured to provide information such as: environmental conditions the asset is subjected to, forces applied to the asset during transportation, length of storage, tampering attempts, and the like. For example, and with continued reference to FIG. 4, in one embodiment, the sensor 412 may comprise an accelerometer configured to sense movement of the asset. Alternatively, or in addition to, the sensor 412 may comprise a temperature sensor, an air quality sensor, a humidity sensor, and/or a tampering sensor. In one embodiment, the tampering sensor may confirm whether or not a pill bottle was opened at any point during transit from the manufacturer to the end consumer.

The flexible circuit board 200 may receive and process signals from the sensor 412 to track sensed information according to any desired criteria. For example, the sensor 412 and the flexible circuit board 200 may provide information about the asset in real time, such as through triangulation of Bluetooth beacons or GPS. In some embodiments, information from the sensor 412 may be time stamped for a retrospective accounting of the information at various times. Information collected by the sensor 412 may be used by the end user to ensure the asset comports with quality assurance requirements.

The flexible asset tracking tag 100 may further comprise a one or more security elements electrically coupled to the battery element 408 and the flexible circuit board 200. In some embodiments, the security element may comprise hardware and software for operational security. For example, the security element may comprise security keys such as Public Key Infrastructure (PKI). Information transmitted by the flexible asset tracking tag 100 may be encrypted for security.

The flexible asset tracking tag 100 may also comprise an anti-tampering system configured to provide an indication that the flexible asset tracking tag 100 may have been tampered with. In one embodiment, the anti-tampering system may comprise a security tape or conductive material. For example, the anti-tampering system may comprise a security tape or sticker having conductive ink that is electrically coupled to the flexible circuit board 200 to create a security device that may not only provide a visual indication of tampering but also generate and transmit an electronic signal indicating that the security device has been triggered.

Any attempt to remove the sticker after being affixed to the flexible asset tracking tag 100 would disturb or otherwise damage the conductive ink impacting the electrical circuit created between the conductive ink and the flexible circuit board 200. For example, if someone attempted to remove the sticker by peeling it off of the flexible asset tracking tag 100 the tape may tear, stretch, or break causing damage to the surface that the conductive ink has been printed on. This damage may interrupt or otherwise sever the electrical connection. The loss of connection may be interpreted by the flexible circuit board 200 as one of several predetermined conditions and generate and/or transmit an electrical signal. For example, in one embodiment, the flexible circuit board 200 would sense the disturbance of the electrical signal, and consequently trigger an interrupt to occur. This interrupt may cause the flexible circuit board 200 to perform any desired function such as to disable the anti-tampering system, transmit a wireless communication indicating that an intrusion occurred, or trigger a routine indicating the anti-tampering system has completed its life cycle and to perform a permanent and complete system shutdown.

The flexible asset tracking tag 100 may be used in a wide variety of applications. The flexible asset tracking tag 100 may allow the user to track asset inventory inside of a warehouse and subsequently track asset delivery to its intended recipient. The information collected by the flexible asset tracking tag 100 may be used to improve supply chain efficiencies, quality control, and/or security. In one exemplary embodiment, the flexible asset tracking tag 100 may provide users with an estimation of the location of the asset, such as within a warehouse, based on a received signal strength indicator (RSSI). Similarly, a truck driver may be notified if a pallet or container containing the flexible asset tracking tag 100 has left the truck. Such information may be useful for asset retention and security.

These and other embodiments for methods of creating a removable identification tag for a textile may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A flexible asset tracking tag, comprising:
   a top cover sheet;
   a circuit board disposed on a flexible substrate disposed below the top cover sheet, wherein the circuit board comprises a communication device configured to wirelessly transmit data over a network to a remote system;
   an antenna printed on the flexible substrate and electrically coupled to the communication device, wherein the antenna and the circuit board comprise a single layer on a surface of the flexible substrate;
   a printed battery disposed below the flexible substrate and electrically coupled to the circuit board; and a bottom sheet disposed below the printed battery and coupled to the top cover sheet.

2. A flexible asset tracking tag according to claim 1, further comprising a sensor coupled to the circuit board and configured to generate a signal in response to a detected condition.

3. A flexible asset tracking tag according to claim 2, wherein the circuit board is configured to use data from the sensor to determine a frequency rate to transmit data via the communication device.

4. A flexible asset tracking tag according to claim 2, wherein the circuit board signals the battery to enter sleep mode until the sensor generates the signal in response to the detected condition.

5. A flexible asset tracking tag according to claim 2, wherein the sensor comprises an accelerometer.

6. A flexible asset tracking tag according to claim 2, further comprising a temperature sensor.

7. A flexible asset tracking tag according to claim 1, wherein the circuit board comprises a pair of battery terminals electrically connected to the printed battery.

8. A flexible asset tracking tag according to claim 1, wherein the communication device comprises a Bluetooth® transmitter.

9. A flexible asset tracking tag according to claim 8, wherein the circuit board further comprises a Global Positioning System (GPS) chip that is configured to generate a signal for transmission by the Bluetooth® transmitter in response to the occurrence of a specified condition.

10. A flexible asset tracking tag according to claim 1, further comprising a device power state transition system coupled to the battery and configured to activate the battery in response to a detected condition.

11. A flexible asset tracking tag according to claim 1, further comprising an anti-tampering system configured to provide an indication that the flexible asset tracking tag has been tampered with.

12. A flexible asset tracking tag according to claim 1, wherein an outward facing surface of the bottom sheet comprises an adhesive layer.

13. A flexible asset tracking tag according to claim 1, further comprising an adhesive mounting pad disposed between the battery and the flexible substrate configured to secure the battery to the lower sheet.

* * * * *